(12) United States Patent
Kawakami et al.

(10) Patent No.: US 11,894,714 B2
(45) Date of Patent: Feb. 6, 2024

(54) POWER SOURCE SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Takafumi Kawakami, Yokkaichi (JP); Masayoshi Hirota, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 138 days.

(21) Appl. No.: 17/754,193

(22) PCT Filed: Sep. 27, 2019

(86) PCT No.: PCT/JP2019/038332
§ 371 (c)(1),
(2) Date: Mar. 25, 2022

(87) PCT Pub. No.: WO2021/059523
PCT Pub. Date: Apr. 1, 2021

(65) Prior Publication Data
US 2022/0302739 A1    Sep. 22, 2022

(51) Int. Cl.
*H02J 7/14* (2006.01)
*H02M 1/00* (2006.01)
*B60R 16/03* (2006.01)

(52) U.S. Cl.
CPC ............ *H02J 7/1423* (2013.01); *B60R 16/03* (2013.01); *H02M 1/0009* (2021.05); *H02J 2310/40* (2020.01)

(58) Field of Classification Search
None
See application file for complete search history.

(56) References Cited

U.S. PATENT DOCUMENTS

2016/0016483 A1    1/2016   Yasunori et al.
2016/0294182 A1   10/2016   Li et al.
(Continued)

FOREIGN PATENT DOCUMENTS

JP    2005-65433 A    3/2005
JP    2012-1159 A     1/2012

OTHER PUBLICATIONS

International Search Report, Application No. PCT/JP2019/038332, dated Nov. 19, 2019. ISA/Japan Patent Office.

*Primary Examiner* — Jared Fureman
*Assistant Examiner* — Joel Barnett
(74) *Attorney, Agent, or Firm* — Honigman LLP (57) ABSTRACT

Provided is a power source system that can more easily realize a configuration that can support a plurality of charging methods and supply a relatively high voltage and a relatively low voltage based on power from a battery. A power source system is a system that is to be installed in a vehicle including a travel motor, and into which a charging current flows via a charging path when receiving supply of power from an external apparatus provided external to the vehicle. The power source system includes a first conductive path and a second conductive path that are electrically connected to the charging path and branch from the charging path, a first relay that is provided on the first conductive path, and a first DC/DC converter that performs voltage conversion.

6 Claims, 7 Drawing Sheets

(56) References Cited

U.S. PATENT DOCUMENTS

2016/0294190 A1\* 10/2016 Li .......................... B60L 58/10
2017/0279264 A1     9/2017 Li
2019/0028017 A1\*  1/2019 Wataru .................... H02M 1/08
2019/0070971 A1\*  3/2019 Kusumi ................ H02J 7/1415

\* cited by examiner

POWER SOURCE SYSTEM

CROSS-REFERENCE TO RELATED APPLICATIONS

This application is the U.S. national stage of PCT/JP2019/038332 filed on Sep. 27, 2019.

TECHNICAL FIELD

The present disclosure relates to a power source system.

BACKGROUND

Electric motor vehicles such as electric automobiles and plug-in hybrid vehicles commonly employ a method of charging a battery that is installed in the vehicle based on power supplied from a charging apparatus provided external to the vehicle. Currently, with this type of technology, a charging method in which charging is performed using a relatively low charging voltage (for example, 400 V) and a charging method in which charging is performed using a relatively high charging voltage (for example, 800 V) are known, and technology that can support both of these charging methods has also been proposed.

For example, in the technology disclosed in JP 2019-47677A, in a charging mode in which charging is performed according to a 400 V charging method, a voltage that is based on DC power from an external charging device is applied to and charges a power storage apparatus, without passing through a step-up apparatus. On the other hand, in a charging mode in which charging is performed according to an 800 V charging method, a voltage that is based on DC power from the external charging device is stepped up by a step-up apparatus and is applied to and charges the power storage apparatus.

However, in JP 2019-47677A, no mention is made of a case where a voltage (for example, 400 V) that is significantly less than an output voltage of the power storage apparatus (for example, 800 V) is supplied to a load. In the technology disclosed in JP 2019-47677A, if a voltage that is significantly less than the output voltage of the power storage apparatus is to be supplied to a load, normally a DC/DC converter needs to be provided separate from a DC/DC converter for charging, which leads to a corresponding increase in the size of a circuit configuration.

Thus, the present disclosure provides a power source system that can more easily realize a configuration that can support a plurality of charging methods and supply a relatively high voltage and a relatively low voltage based on power from a battery.

SUMMARY

A power source system according to a first aspect of the present disclosure that is to be installed in a vehicle including a travel motor, and into which a charging current flows via a charging path when receiving supply of power from an external apparatus provided external to the vehicle, the power source system including: a first conductive path and a second conductive path that are electrically connected to the charging path and branch from the charging path; a relay that is provided on the first conductive path; and a voltage conversion unit configured to perform voltage conversion, wherein the first conductive path is formed as a path between the charging path and a battery, the relay switches between an off state in which current is blocked from flowing between the charging path and the battery via the first conductive path, and an on state in which current is allowed to flow, the second conductive path is disposed between the charging path and the voltage conversion unit, the voltage conversion unit performs at least a first operation of stepping up a voltage applied to the second conductive path and applying the resulting voltage as an output voltage to a conductive path on the battery side, and a second operation of stepping down a voltage applied to the conductive path on the battery side and applying the resulting voltage as an output voltage to the second conductive path, a first operation state where power from the battery is supplied to the motor side via the first conductive path and the relay is entered when the relay is on, and a second operation state where power from the voltage conversion unit is supplied to the motor side via the second conductive path as a result of the voltage conversion unit performing the second operation is entered when the relay is off.

Advantageous Effects of Invention

A power source system according to an aspect of the present disclosure can more easily realize a configuration in which a relatively high voltage and a relatively low voltage can be supplied based on power from a battery.

DETAILED DESCRIPTION OF PREFERRED EMBODIMENTS

Embodiments of the present disclosure will be listed and described below. Note that the features of (1) to (6) described below may be combined in any manner provided that no contradiction arises.

Feature 1

A power source system that is to be installed in a vehicle including a travel motor, and into which a charging current flows via a charging path when receiving supply of power from an external apparatus provided external to the vehicle, the power source system including: a first conductive path and a second conductive path that are electrically connected to the charging path and branch from the charging path; a relay that is provided on the first conductive path; and a voltage conversion unit configured to perform voltage conversion, wherein the first conductive path is formed as a path between the charging path and a battery, the relay switches between an off state in which current is blocked from flowing between the charging path and the battery via the first conductive path, and an on state in which current is allowed to flow, the second conductive path is disposed between the charging path and the voltage conversion unit, the voltage conversion unit performs at least a first operation of stepping up a voltage applied to the second conductive path and applying the resulting voltage as an output voltage to a conductive path on the battery side, and a second operation of stepping down a voltage applied to the conductive path on the battery side and applying the resulting voltage as an output voltage to the second conductive path, a first operation state where power from the battery is supplied to the motor side via the first conductive path and the relay is entered when the relay is on, and a second operation state where power from the voltage conversion unit is supplied to the motor side via the second conductive path as a result of the voltage conversion unit performing the second operation is entered when the relay is off.

The power source system in feature 1 enters a first operation state where power from the battery is supplied to the motor side via the first conductive path and the relay when the relay is on. Accordingly, a relatively high voltage can be supplied to the motor side at the time of the first operation state. Also, the power source system enters a second operation state where power from the voltage conversion unit is supplied to the motor side via the second conductive path as a result of the voltage conversion unit performing the second operation when the relay is off. Accordingly, a relatively low voltage can be supplied to the motor side at the time of the second operation state. Furthermore, the power source system can realize the first operation state and the second operation state by using the voltage conversion unit and the relay which are used to charge the battery, and thus it is possible to more easily realize a configuration in which a relatively high voltage and a relatively low voltage can be supplied based on power from the battery.

Feature 2

The power source system in feature 1, further including a control unit configured to control the relay and the voltage conversion unit, wherein the control unit turns on the relay in response to a first condition being met, and turns off the relay and causes the voltage conversion unit to perform the second operation in response to a second condition that is different from the first condition being met.

The power source system in feature 2 can perform control to make a switch such that a relatively high voltage is supplied from the battery to the motor side without involving the voltage conversion unit, in response to the first condition being met. Also, the power source system can perform control to make a switch such that a relatively low voltage is supplied from the battery to the motor side via the voltage conversion unit, in response to the second condition being met.

Feature 3

The power source system in feature 1 or 2, wherein the relay is a first relay, a second relay is provided on the second conductive path, and the second relay switches between an off state in which current is blocked from flowing between the charging path and the voltage conversion unit via the second conductive path, and an on state in which current is allowed to flow.

The power source system in feature 3 can allow and block the flow of current through the second conductive path as needed, and is advantageous in a configuration in which a situation may occur where blocking of the second conductive path is desirable.

Feature 4

The power source system in feature 3, wherein the second conductive path includes a first supply path that is a path between the charging path and the second relay, and a second supply path that is a path between the second relay and the voltage conversion unit, a third conductive path that is a path for supplying power to a load is electrically connected to the second supply path, and as a result of the second relay being kept off and the voltage conversion unit performing the second operation in the first operation state, power is supplied from the voltage conversion unit to the load side via the third conductive path.

As a result of the second relay being kept off and the voltage conversion unit performing the second operation when the power source system in feature 4 is in the first operation state, power is supplied from the voltage conversion unit to the load side via the third conductive path. That is, in the first operation state, an operation is possible where a relatively high voltage is supplied from the battery to the motor side without supplying the power via the voltage conversion unit, and current is blocked from flowing to the motor side via the second conductive path while a relatively low voltage from the voltage conversion unit is supplied to the load side. The power source system can operate in this manner, and thus a separate converter that is different from the voltage conversion unit is not required to supply a relatively low voltage from the battery to a load, and the above functions can be realized while realizing a simplified apparatus configuration.

Feature 5

The power source system in feature 1 or 2, wherein the relay is a first relay, a second relay is provided on the second conductive path, the second relay is configured to switch between an off state in which current is blocked from flowing between the charging path and the voltage conversion unit via the second conductive path, and an on state in which current is allowed to flow, the second conductive path includes a first supply path that is a path between the charging path and the second relay, and a second supply path that is a path between the second relay and the voltage conversion unit, a third conductive path that is a path for supplying power to a load is electrically connected to the second supply path, the power source system includes a control unit configured to control the first relay, the second relay, and the voltage conversion unit, and the control unit turns on the first relay, turns off the second relay, and causes the voltage conversion unit to perform the second operation in response to a first condition being met, and turns off the first relay, turns on the second relay, and causes the voltage conversion unit to perform the second operation in response to a second condition that is different from the first condition being met.

The power source system in feature 5 can perform control to make a switch such that a relatively high voltage is supplied from the battery to the motor side without involving the voltage conversion unit, in response to the first condition being met. Also, the power source system can perform control to make a switch such that a relatively low voltage is supplied from the battery to the motor side via the voltage conversion unit, in response to the second condition being met. Furthermore, in the case where a relatively high voltage is supplied to the motor side in response to the first condition being met, the power source system can perform control to turn off the second relay while causing the voltage conversion unit to perform the second operation in parallel. That is, the power source system can perform control for supplying a relatively high voltage to the motor side and control for stably supplying a relatively low voltage to the load side in parallel. Furthermore, a separate converter that is different from the voltage conversion unit is not required to supply a relatively low voltage from the battery to a load, and the above functions can be realized while realizing a simplified apparatus configuration.

Feature 6

The power system according to any one of features 1 to 5, including a control unit configured to control the relay and the voltage conversion unit, in which, in the case where power is supplied from the external apparatus to the vehicle, if the voltage applied to the charging path is in a first voltage state, the control unit turns on the relay, and in the case where power is supplied from the external apparatus to the vehicle, if the voltage applied to the charging path is in a second voltage state in which the voltage is lower than that in the first voltage state, the control unit turns off the relay and causes the voltage conversion unit to perform the first operation.

The power source system in feature 6 can use control by the control unit to turn on the relay and charge the battery directly without involving the voltage conversion unit when performing a charging method in which the voltage applied to the charging path is relatively high, such that the voltage enters the first voltage state. Also, when performing a charging method in which the voltage applied to the charging path is relatively low, such that the voltage enters the second voltage state, the power source system can use the control unit to turn off the relay and charge the battery via the voltage conversion unit.

First Embodiment

Figure 1:
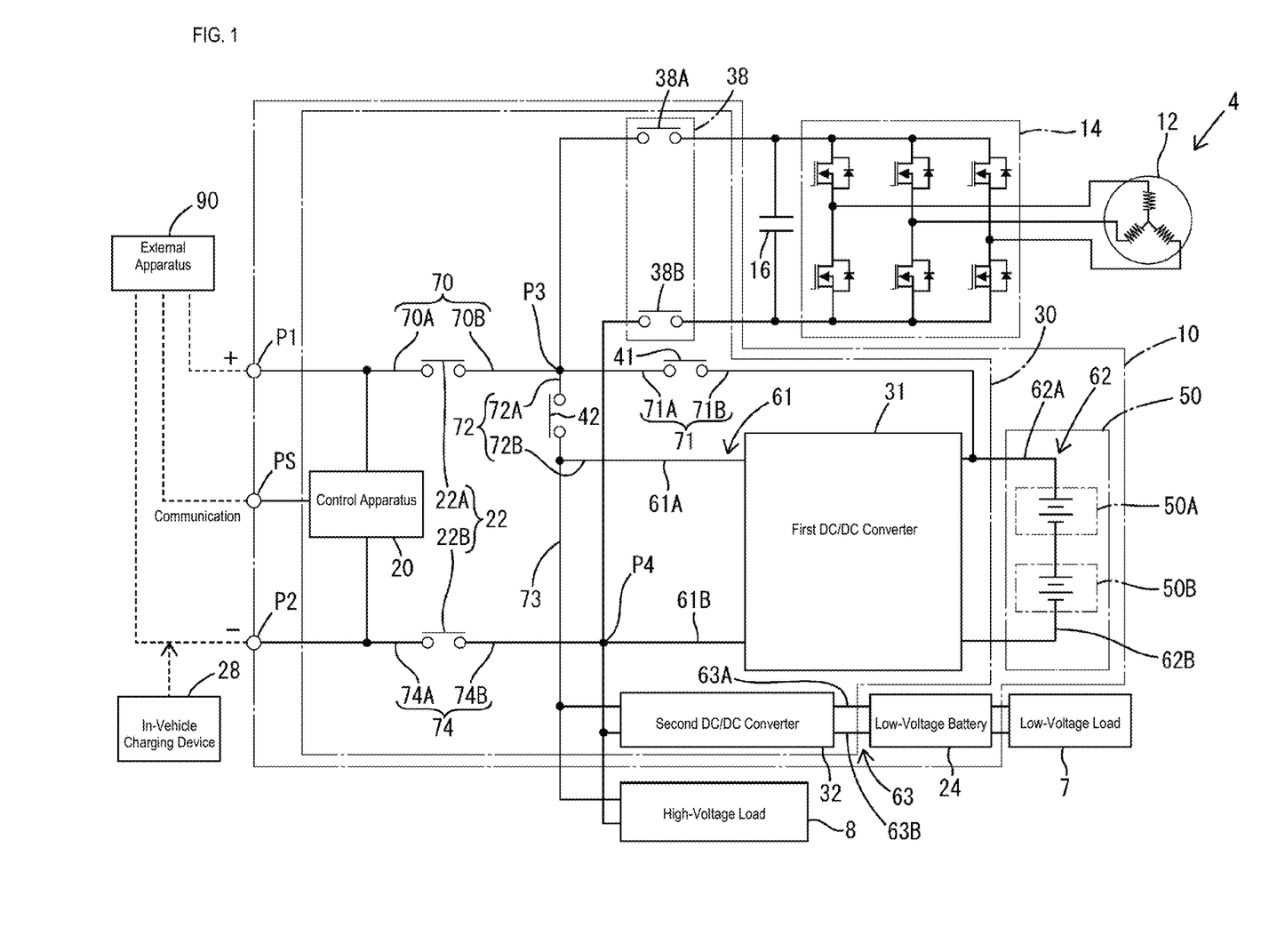
FIG. 1 is a block diagram showing an example of a configuration of an in-vehicle system using a power source system of a first embodiment of the present disclosure.
Figure 2:
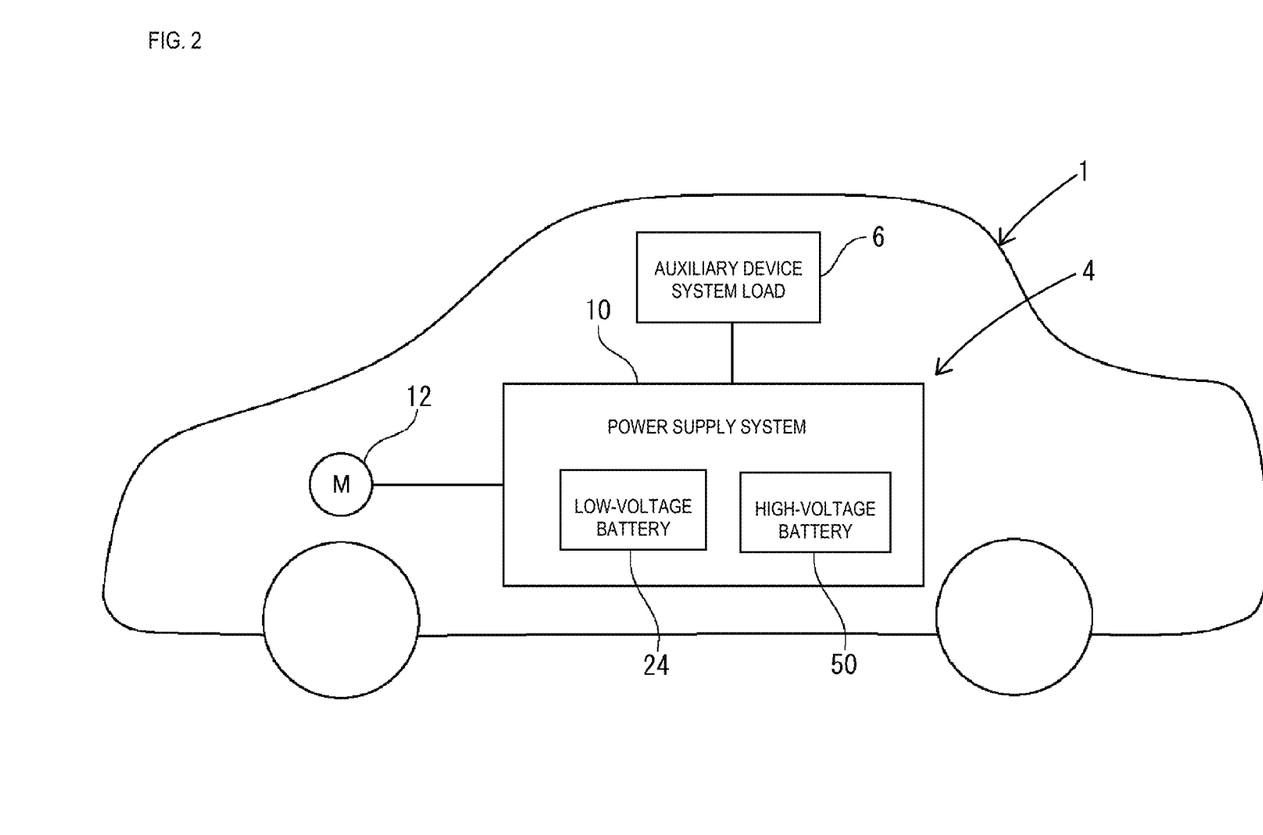
FIG. 2 is a schematic diagram schematically showing an example of a vehicle in which the power source system shown in FIG. 1 is installed.

An in-vehicle system 4 shown in FIG. 1 includes a power supply system 10, a low-voltage load 7, a high-voltage load 8, a motor 12, an inverter 14, a capacitor 16, and the like. As shown in FIG. 2, the in-vehicle system 4 is a system that is installed in a vehicle 1. The vehicle 1 includes the power supply system 10, and an auxiliary device system load 6 and the motor 12 which are supplied with power converted or transmitted by the power supply system 10. The auxiliary device system load 6 is the low-voltage load 7, the high-voltage load 8, and the like. As shown in FIGS. 1 and 2, the power supply system 10 includes a high-voltage battery 50, a low-voltage battery 24, a power source system 30, and the like. The power supply system 10 is a system that can supply power to the motor 12, the low-voltage load 7, the high-voltage load 8, and the like.

The high-voltage battery 50 corresponds to an example of a battery. The high-voltage battery 50 includes power storage units 50A and 50B, and functions as a power supply apparatus. The power storage units 50A and 50B are each a battery unit formed by a storage cell that can be charged and discharged. The high-voltage battery 50 is a battery that can output a larger voltage than the low-voltage battery 24. The power storage units 50A and 50B are each a 400-volt battery unit, for example. Being 400-volt means that the rated charging voltage and output voltage are 400 V. The power storage units 50A and 50B are connected in series. The power storage units 50A and 50B may be configured as unitized cells or as a single cell. While, for example, known cells such as lithium-ion batteries can be employed as the cells constituting the power storage units 50A and 50B, the type of the cells is not limited.

The power source system 30 is a system that is installed in the vehicle 1 including the travel motor 12, and into which a charging current flows via a charging path 70 when receiving supply of power from an external apparatus 90 provided external to the vehicle 1. Furthermore, the power source system 30 is a system that includes a function of converting power supplied from the high-voltage battery 50, and a function of transmitting power supplied from the high-voltage battery 50. It is desirable that the power source system 30 is provided with at least a first DC/DC converter 31, a first conductive path 71, a second conductive path 72, and a first relay 41. Furthermore, it is desirable that the power source system 30 is provided with a second relay 42, a third conductive path 73, a control apparatus 20, a second DC/DC converter 32, a switch unit 22, a switch unit 38, and the like.

The first DC/DC converter 31 corresponds to an example of a voltage conversion unit that performs voltage conversion. The first DC/DC converter 31 is constituted by an insulated bidirectional DC/DC converter, for example. Various configurations of a known insulated bidirectional DC/DC converter can be employed as the first DC/DC converter 31. The first DC/DC converter 31 is electrically connected to a power path 61 that is a path for supplying power to the motor 12 side. The first DC/DC converter 31 is also electrically connected to a power path 62 that is a path for supplying power from the high-voltage battery 50. The first DC/DC converter 31 can perform a first operation of stepping up a voltage applied to the later-described second conductive path 72, and applying the resulting voltage as an output voltage to a wire 62A on the high-voltage battery 50 side. The first DC/DC converter 31 can also perform a second operation of stepping down a voltage applied to the wire 62A on the high-voltage battery 50 side, and applying the resulting voltage as an output voltage to the second conductive path 72.

The power path 61 connected to one side of the first DC/DC converter 31 includes a wire 61A that is a high-potential-side conductive path, and a wire 61B that is a low-potential-side conductive path. The power path 62 connected to the other side of the first DC/DC converter 31 is provided with the wire 62A that is a high-potential-side conductive path, and a wire 62B that is a low-potential-side conductive path. One end of the wire 62A is electrically connected to the high-potential-side electrode with the highest potential of the high-voltage battery 50. The wire 62A has a potential that is substantially the same as that of the high-potential-side electrode. The other end of the wire 62A is electrically connected to the first DC/DC converter 31. One end of the wire 62B is electrically connected to the low-potential-side electrode with the lowest potential of the high-voltage battery 50. The wire 62B has a potential that is substantially the same as that of the low-potential-side electrode. The other end of the wire 62B is electrically connected to the first DC/DC converter 31.

The first DC/DC converter 31 performs the first operation of converting the voltage applied to the power path 61 and making the voltage of the power path 62 a desired output voltage. Also, the first DC/DC converter 31 performs a second operation of converting the voltage applied to the power path 62 and making the voltage of the power path 61 a desired output voltage. Specifically, the voltage of the power path 61 is the potential difference between the wires 61A and 61B. Specifically, the voltage of the power path 62 is the potential difference between the wires 62A and 62B. The first operation is a step-up operation of stepping up a relatively low first voltage applied to the power path 61, and applying a relatively high second voltage to the power path 62. The first voltage is a DC voltage of approximately 400 V, for example. The second voltage is a DC voltage of approximately 800 V, for example. The second operation is a step-down operation of stepping down a relatively high third voltage applied to the power path 62, and applying a relatively low fourth voltage to the power path 61. The third voltage is approximately the same as the second voltage and is a DC voltage of approximately 800 V for example. The fourth voltage is approximately the same as the first voltage and is a DC voltage of approximately 400 V, for example. Note that the specific examples of the aforementioned input voltages and the output voltages in the first operation and the second operation are merely examples, and the values of the first voltage, the second voltage, the third voltage, and the fourth voltage are not limited to the aforementioned values.

The second DC/DC converter 32 is constituted by a known insulated DC/DC converter, for example. Specifically, the second DC/DC converter 32 is a step-down DC/DC converter that converts a relatively high supply voltage supplied from the first DC/DC converter 31 to a voltage lower than the supply voltage. One side of the second DC/DC converter 32 is electrically connected to the power path 61, and the other side is electrically connected to a power path 63. The second DC/DC converter 32 performs a step-down operation of stepping down the voltage between the wires 61A and 61B constituting the first power path 61, and applying a desired output voltage between wires 63A and 63B constituting the power path 63. In the voltage conversion operation performed by the second DC/DC converter 32, the potential difference between the wires 61A and 61B, which is the input voltage, is the output voltage of the first DC/DC converter 31 during the aforementioned second operation, and is a voltage of approximately 400 V for example. In the voltage conversion operation performed by the second DC/DC converter 32, the potential difference between the wires 63A and 63B, which is the output voltage from the second DC/DC converter 32, is 12 V for example. The aforementioned input voltage and output voltage for when the second DC/DC converter 32 is operated are merely examples, and are not limited to the aforementioned values.

A pair of terminals on the output side of the second DC/DC converter 32 are connected to a pair of terminals of the low-voltage battery 24. Specifically, the output terminal on the high-potential-side of the second DC/DC converter 32 is electrically connected to an electrode on the high-potential-side of the low-voltage battery 24 via the wire 63A. The output terminal on the low-potential-side of the second DC/DC converter 32 is electrically connected to an electrode on the low-potential-side of the low-voltage battery 24 via the wire 63B. The output terminals of the low-voltage battery 24 are also electrically connected to the low-voltage load 7. The low-voltage battery 24 is charged by a voltage received from the second DC/DC converter 32, and supplies power to the low-voltage load 7.

Charging paths 70 and 74 are conductive paths for supplying a charging current that is based on power received from an external apparatus. The charging path 70 is a high-potential-side conductive path, and corresponds to an example of a charging path. The charging paths 70 and 74 are each switched between a conductive state and a non-conductive state by corresponding switches 22A and 22B, the switches 22A and 22B constituting the switch unit 22. The charging path 70 includes a first charging path 70A that is on a terminal P1 side relative to the switch 22A, and a second charging path 70B that is on a connection point P3 side relative to the switch 22A. When the switch 22A is on, current can flow between the first charging path 70A and the second charging path 70B. When the switch 22A is off, current is blocked from flowing between the first charging path 70A and the second charging path 70B. The charging path 74 is a low-potential-side conductive path. The charging path 74 includes a third charging path 74A that is on a terminal P2 side relative to the switch 22B, and a fourth charging path 74B that is on a connection point P4 side relative to the switch 22B. When the switch 22B is on, current can flow between the third charging path 74A and the fourth charging path 74B. When the switch 22B is off, current is blocked from flowing between the third charging path 74A and the fourth charging path 74B.

The charging paths 70 and 74 are input paths that are envisioned as receiving voltages of varying levels from an external apparatus. For example, if an external apparatus 90 that is connected for rapid charging is an apparatus that can apply the first voltage (for example, 800 V) across the terminals P1 and P2, the first voltage that is based on power from the external apparatus 90 is applied across the charging paths 70 and 74, and current flows to the charging path 70. Also, if the external apparatus 90 that is connected for rapid charging is an apparatus that can apply the second voltage (for example, 400 V) across the terminals P1 and P2, the second voltage that is based on power from the external apparatus 90 is applied across the charging paths 70 and 74, and current flows to the charging path 70. Also, in the case where a predetermined voltage (for example, 400 V) is applied across the terminals P1 and P2 by an in-vehicle charging device 28 based on commercial power from an external apparatus, the predetermined voltage is applied across the charging paths 70 and 74 based on power from the in-vehicle charging device 28, and current flows to the charging path 70.

The first conductive path 71 is one conductive path that is electrically connected to the charging path 70 and branches from the charging path 70. The second conductive path 72 is the other conductive path that is electrically connected to the charging path 70 and branches from the charging path 70. In other words, the first conductive path 71 and the second conductive path 72 branch from the connection point P3 that is at one end of the charging path 70.

The first conductive path 71 is configured as a path on which current flows between the charging path 70 and the high-voltage battery 50. One end of the first conductive path 71 is electrically connected to the charging path 70, and the other end is electrically connected to a high-potential-side electrode of the high-voltage battery 50. The first relay 41 is provided at an intermediate position of the first conductive path 71. The first conductive path 71 includes wires 71A and 71B.

The second conductive path 72 is disposed between the charging path 70 and the first DC/DC converter 31. The second conductive path 72 is provided with a first supply path 72A and a second supply path 72B. The first supply path 72A is a path between the charging path 70 and the second relay 42. The second supply path 72B is a path between the second relay 42 and the first DC/DC converter 31. The wire 61A is a portion of the second supply path 72B. One end of the wire 61A (that is, one end of the second supply path 72B) is electrically connected to a high-potential-side terminal on one side of the first DC/DC converter 31.

The third conductive path 73 is a conductive path that branches from the second supply path 72B, and is a path for supplying power to a load. One end of the third conductive path 73 is electrically connected to the second supply path 72B. The third conductive path 73 is electrically connected to the high-potential-side input terminal of the second DC/DC converter 32, and is also electrically connected to a high-potential-side input terminal of the high-voltage load 8.

The fourth charging path 74B side of the charging path 74 is electrically connected to a low-potential-side terminal on one side of the first DC/DC converter 31, the low-potential-side input terminal of the second DC/DC converter 32, and the low-potential-side input terminal of the high-voltage load 8. The other end of the fourth charging path 74B is the connection point P4, and the conductive path between the connection point P4 and the low-potential-side terminal on one side of the first DC/DC converter 31 is the wire 61B.

The first relay 41 corresponds to an example of a relay. The first relay 41 is provided on the first conductive path 71. The first relay 41 switches between an off state where it blocks current from flowing between the charging path 70 and the high-voltage battery 50 via the first conductive path 71, and an on state where it allows current to flow. In other words, when the first relay 41 is off, no current flows through the first conductive path 71, and, when the first relay 41 is on, current can flow through the first conductive path 71.

The second relay 42 is provided on the second conductive path 72. The second relay 42 switches between an off state where it blocks current from flowing between the charging path 70 and the first DC/DC converter 31 via the second conductive path 72, and an on state where it allows the current to flow. Specifically, when the second relay 42 is off, no current flows through the second conductive path 72, and, when the second relay 42 is on, current can flow through the second conductive path 72.

Switches 38A and 38B constituting the switch unit 38 are, for example, constituted by a semiconductor relay, an electromagnetic relay, or the like. Both switches 38A and 38B are turned on when instructed to turn on by an external apparatus, and are turned off when instructed to turn off by an external apparatus. The control apparatus that controls the switches 38A and 38B may be the control apparatus 20 or another apparatus. The switch 38A is interposed between a conductive path connected to an input terminal on one side of the inverter 14 and the connection point P3, and switches the path between the two between a conductive state and a non-conductive state. The switch 38B is interposed between a conductive path connected to an input terminal on the other side of the inverter 14 and the connection point P4, and switches the path between the two between a conductive state and a non-conductive state. When the switches 38A and 38B are off, no power is supplied from the high-voltage battery 50 side to the inverter 14 side. When both of the switches 38A and 38B are on, power can be supplied from the high-voltage battery 50 side to the inverter 14 side.

The control apparatus 20 is an apparatus that is provided with a computational function and an information processing function, and is, for example, constituted by an information processing apparatus such as an ECU (Electronic Control Unit). The control apparatus 20 controls the switch unit 22, the switch unit 38, the first relay 41, the second relay 42, the first DC/DC converter 31, and the second DC/DC converter 32. The control apparatus 20 may be constituted by a single information processing apparatus or by a plurality of information processing apparatuses.

The inverter 14 is configured as a circuit that supplies power for driving the motor 12 to the motor 12. The pair of input terminals of the inverter 14 are respectively electrically connected to the connection points P3 and P4 via the switches 38A and 38B that constitute the switch unit 38. An output terminal of the inverter 14 is connected to an input terminal of the motor 12. A voltage of approximately 400 V obtained by stepping-down by the first DC/DC converter 31 or a voltage of approximately 800 V directly supplied from the high-voltage battery 50 can be applied to the pair of input terminals provided on the inverter 14. In the case where 400 V of power is input, the inverter 14 generates power for driving the motor 12 based on this power. In the case where 800 V of power is applied, the inverter 14 generates power for driving the motor 12 based on this power. The motor 12 is an electric driving apparatus such as a main device motor. The motor 12 is supplied with power via the inverter 14. Note that the capacitor 16 is provided between the conductive path connected to the input terminal on one side of the inverter 14 and the conductive path connected to the input terminal on the other side of the inverter 14.

The high-voltage load 8 is a load that is provided with a high voltage. The high-voltage load 8 may be, for example, an air conditioner, a heater, or another load. The high voltage applied to the high-voltage load 8 is, for example, 400 V, and is a higher voltage than the low voltage applied to the low-voltage load 7. The high-voltage load 8 is electrically connected to the power path 61, and receives a high voltage that corresponds to the potential difference between the wires 61A and 61B.

The in-vehicle charging device 28 corresponds to an example of a charging apparatus. The in-vehicle charging device 28 is connected to the charging paths 70 and 74 via a pair of corresponding conductive paths that are not shown. In the case where power is supplied to the in-vehicle charging device 28 from a device external to the vehicle 1, the in-vehicle charging device 28 can apply a DC voltage that is based on power from the external apparatus across the charging paths 70 and 74. Specifically, when, for example, the in-vehicle charging device 28 is supplied with power from commercial power that is supplied to a household, the in-vehicle charging device 28 converts this power to a desired DC voltage and applies the resulting voltage across the charging paths 70 and 74. The DC voltage applied to the charging paths 70 and 74 by the in-vehicle charging device 28 is 400 V, for example. Note that the in-vehicle charging device 28 may include a wireless power transmission charging device.

As shown in FIG. 2, the aforementioned in-vehicle system 4 is installed in the vehicle 1, which is a plug-in hybrid electric vehicle (PHEV), an electric vehicle (EV), or the like. The in-vehicle system 4 charges the high-voltage battery 50 and the low-voltage battery 24 based on power from an external apparatus when in a charging mode. When the vehicle is in motion, the in-vehicle system 4 supplies power from the high-voltage battery 50 and the low-voltage battery 24 to the motor 12, the auxiliary device system load 6, and the like. The auxiliary device system load 6 is an additional device that is required for running an engine, a motor, or the like, and mainly includes a cell motor, an alternator, a radiator cooling fan, and the like. The auxiliary device system load 6 may include the low-voltage load 7 (lighting, a wiper driving unit, or the like) and the high-voltage load 8 (an air conditioner, a heater, a navigation device, or the like).

Figure 3:
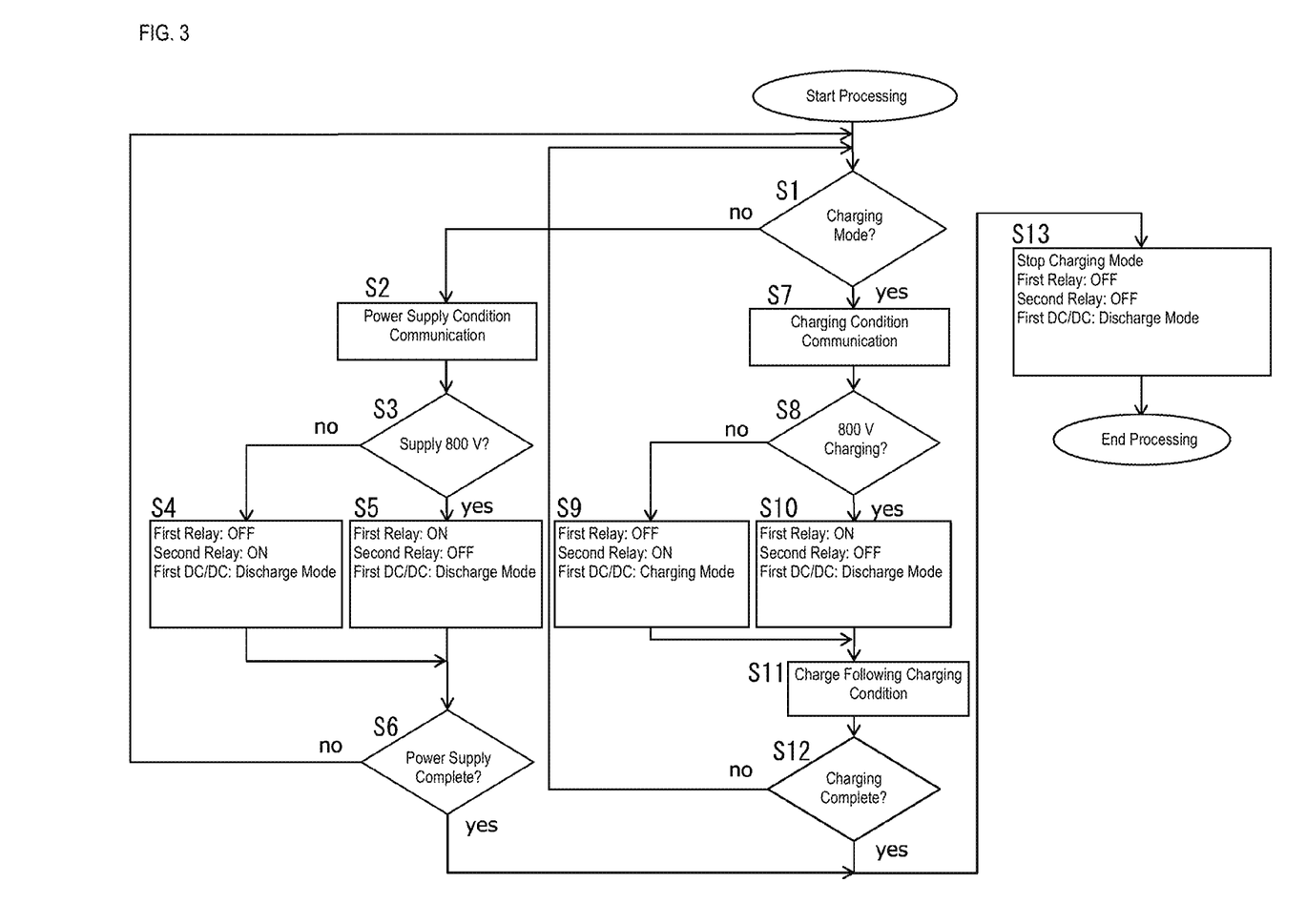
FIG. 3 is a flow chart illustrating an example of a flow of control performed in the power source system of the first embodiment.

In FIG. 3, the flow of control performed by the power source system 30 is shown using a flow chart. The control apparatus 20 executes the control shown in FIG. 3 in response to a start condition being met. The start condition may be that the vehicle enters a start-up state, that the external apparatus 90 is connected, that the in-vehicle charging device 28 meets a charging start condition, or another condition. Once the control shown in FIG. 3 has started, the control apparatus 20 determines in step S1 whether or not the vehicle 1 is in the charging mode. In the present disclosure, the control apparatus 20 is configured to able to communicate with the external apparatus 90 or the in-vehicle charging device 28, and, if a predetermined charging signal is received from the external apparatus 90 or the in-vehicle charging apparatus 28, for example, the control apparatus 20 determines in step S1 that the vehicle 1 is in the charging mode. The charging signal is a predetermined signal that serves as a condition for charging to be performed by the external apparatus 90 or the in-vehicle charging device 28. Note that the aforementioned determination method is merely one example, and the "determination as to whether or not the vehicle 1 is in the charging mode" performed in step S1 may be performed using a determination method different from that described above.

If it is determined in step S1 that the vehicle 1 is not in the charging mode (NO in step S1), the control apparatus 20 obtains a power supply condition through communication in step S2. The control apparatus 20 communicates with, for example, a specific external device (for example, a specific external ECU) in step S2, and makes a request to the specific external device for a signal indicating a power supply condition. The specific external device is, for example, able to transmit a signal indicating a power supply condition in response to the request made in step S2, to the control apparatus 20. In the example of the present disclosure, a signal indicating a first power supply condition and a signal indicating a second power supply condition are determined in advance for the control apparatus 20 and the specific external device. The signal indicating the first power supply condition is a signal indicating power supply at the first voltage (for example, 800 V). The signal indicating the second power supply condition is a signal indicating power supply at the second voltage (for example, 400 V). When a predetermined first determination condition is met, the specific external device transmits the signal indicating the first power supply condition to the control apparatus 20 in response to the request made in step S2. Also, when a predetermined second determination condition is met, the specific external device transmits the signal indicating the second power supply condition to the control apparatus 20 in response to the request made in step S2. The content of the first determination condition and the second determination condition is not particularly limited, and various conditions can be condition setting candidates.

Once a signal indicating the power supply condition has been received from the specific external device in step S2, the control apparatus 20, determines the type of the signal indicating the power supply condition in step S3. If the signal received in step S2 is the signal indicating the first power supply condition (for example, the signal indicating power supply of 800 V), the control apparatus 20 determines YES in step S3, and performs the processing of step S5. If the signal received in step S2 is the signal indicating the second power supply condition (for example, the signal indicating power supply of 400 V), the control apparatus 20 determines NO in step S3, and performs the processing of step S4.

When the processing of step S5 is performed, the control apparatus 20 performs charging according to the first power supply condition. In the processing of step S5, the control apparatus 20 turns the first relay 41 on and the second relay 42 off. Furthermore, the control apparatus 20 turns off the switches of the switch unit 22, and turns on the switches of the switch unit 38. On the other hand, the control apparatus 20 causes the first DC/DC converter 31 to perform a step-down operation (discharge mode operation) such that the voltage applied to the second power path 62 is stepped down and a voltage of 400 V is applied to the first power path 61.

Figure 4:
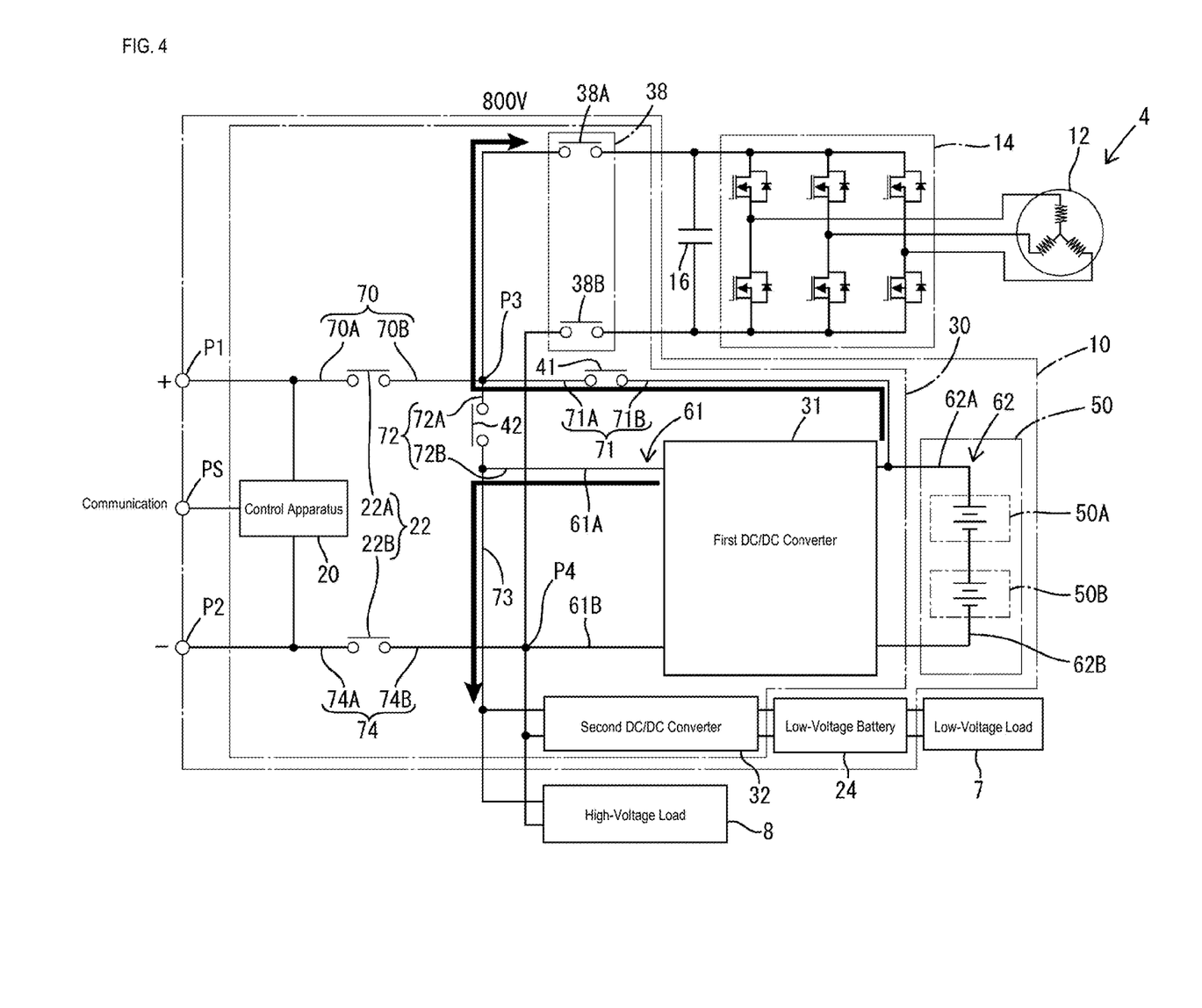
FIG. 4 is a descriptive diagram for describing a first operation state of the power source system of the first embodiment.

In this way, the control apparatus 20 turns on the first relay 41 in step S5 in response to the first condition being met. The first condition being met means the control apparatus 20 receiving the signal indicating the first power supply condition in step S2, or in other words, the first determination condition being met. In the case where the control apparatus 20 turns on the first relay 41 in step S5, a first operation state is entered where power from the high-voltage battery 50 is supplied to the inverter 14 side and the motor 12 side via the first conductive path 71 and the first relay 41, as shown in FIG. 4. In this first operation state, a voltage corresponding to the output voltage of the battery 50 is applied to the first conductive path 71, and a voltage of approximately 800 V is applied across the input terminals on both sides of the inverter 14. Furthermore, in parallel with this first operation state, the second relay 42 is kept off and the first DC/DC converter 31 performs a second operation. Accordingly, as shown in FIG. 4, power is supplied from the first DC/DC converter 31 to a load side via the third conductive path 73. The power supplied from the DC/DC converter 31 can be directly supplied to the high-voltage load 8 while also being stepped down by the second DC/DC converter 32 and supplied to the low-voltage battery 24 or the low-voltage load 7.

When the processing of step S4 is performed, the control apparatus 20 performs charging according to the second power supply condition. Specifically, the control apparatus 20 turns off the first relay 41 and turns on the second relay 42. The control apparatus 20 also turns off the switches of the switch unit 22 and turns on the switches of the switch unit 38. On the other hand, the control apparatus 20 causes the first DC/DC converter 31 to perform the step-down operation (discharge mode operation) such that the voltage applied to the second power path 62 is stepped down and a voltage of 400 V is applied to the first power path 61.

Figure 5:
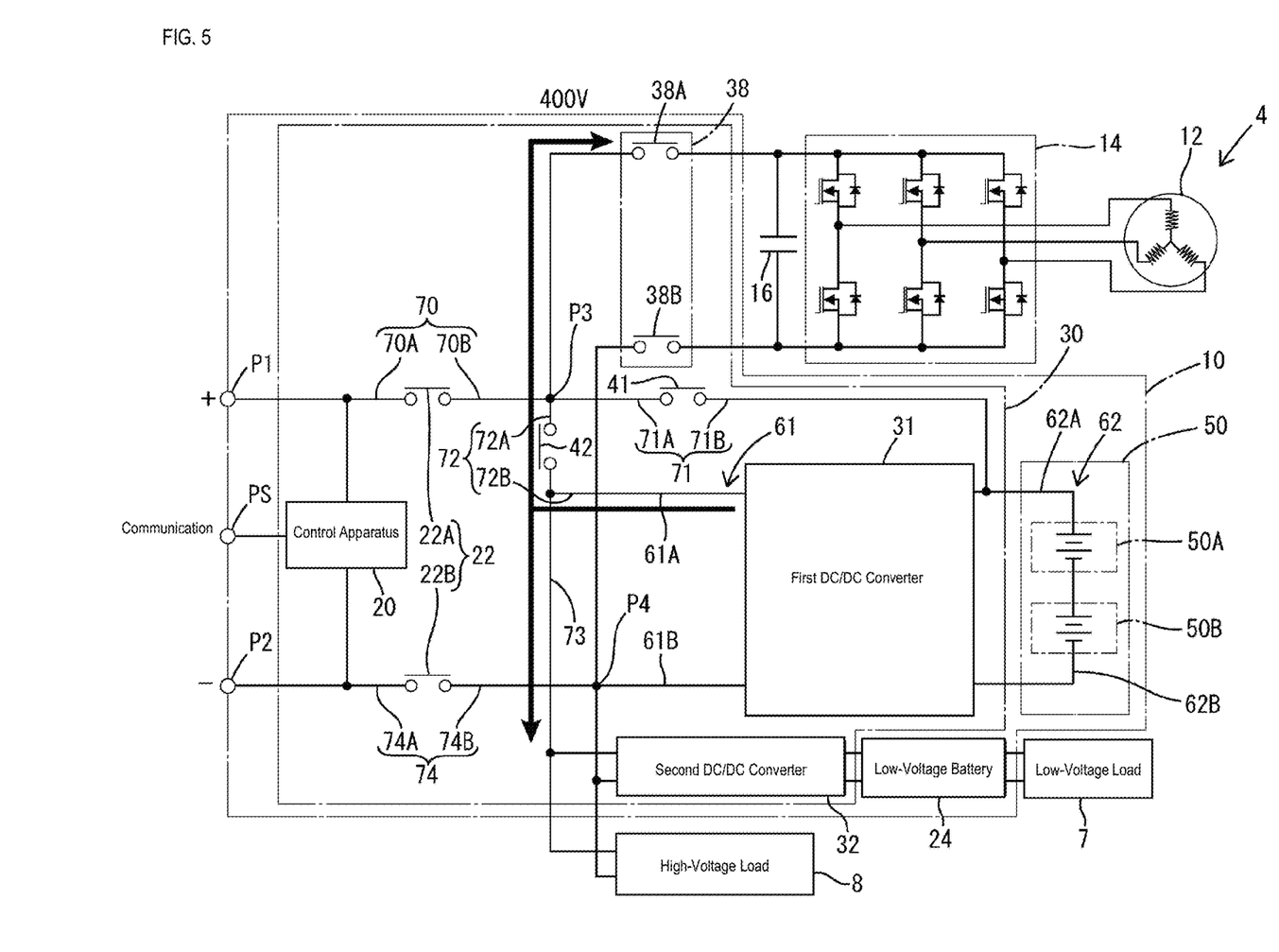
FIG. 5 is a descriptive diagram for describing a second operation state of the power source system of the first embodiment.

In this way, the control apparatus 20 turns off the first relay 41, turns on the second relay 42, and causes the first DC/DC converter 31 to perform the second operation, in response to the second condition being met, the second condition being different from the first condition. The second condition being met means the control apparatus 20 receiving the signal indicating the second power supply condition in step S2, in other words, the second determination condition being met. In the case where the control apparatus 20 causes the first DC/DC converter 31 to perform the second operation in step S4, a second operation state is entered where power from the first DC/DC converter 31 is supplied to the motor 12 side via the second conductive path 72, as shown in FIG. 5. In this second operation state, a voltage corresponding to the output voltage of the first DC/DC converter 31 is applied to the second conductive path 72, and a voltage of approximately 400 V is applied across the input terminals on both sides of the inverter 14. Furthermore, in this case, power that is supplied from the first DC/DC converter 31 is also supplied to a load side via the third conductive path 73. That is, power supplied from the first DC/DC converter 31 can be directly supplied to the high-voltage load 8 while also being stepped down by the second DC/DC converter 32 and supplied to the low-voltage battery 24 or the low-voltage load 7.

After step S4 or step S5, the control apparatus 20 determines whether or not a predetermined power supply completion condition has been met in step S6. The power supply completion condition is not particularly limited, and may be, for example, that the control apparatus 20 receives a signal indicating that power supply is complete from the aforementioned specific external apparatus, or that another condition is met. In the case where the predetermined power supply completion condition is determined as not having been met in step S6 (NO in step S6), the control apparatus 20 returns the processing to step S1 and performs the processing from step S1 again. In the case where the predetermined power supply completion condition is determined as having been met in step S6 (YES in step S6), the control apparatus 20 advances the processing to step S13.

If it is determined that the vehicle 1 is in the charging mode in step S1 (YES in step S1), the control apparatus 20 obtains the charging condition through communication in step S7. In the present disclosure, the signal indicating a first charging condition and the signal indicating a second charging condition are determined in advance in the control apparatus 20. Also, one or both of the signal indicating the first charging condition and the signal indicating the second charging condition are determined in a plurality of external apparatuses 90. Also, at least the signal indicating the second charging condition is determined in the in-vehicle charging device 28. In step S7, the control apparatus 20 communicates with the external apparatus 90 or an external device such as the in-vehicle charging device 28, and makes a request to the external device for a signal that indicates a charging condition, for example. The signal indicating the first charging condition is a signal indicating power supply at the first voltage (for example, 800 V), and is a signal that can be transmitted from an external apparatus 90 that can supply power at the first voltage (800 V), in response to the request made in step S2. The signal indicating the second charging condition is a signal indicating power supply at the second voltage (for example, 400 V), and is a signal that can be transmitted from the external apparatus 90 or the in-vehicle charging device 28 that can supply power at the second voltage (for example, 400 V), in response to the request made in step S2.

Upon receiving a signal indicating the charging condition from the external device in step S7, the control apparatus 20, in step S8, determines the type of the signal indicating the charging condition. If the signal received in step S7 is the signal indicating the first charging condition (for example, the signal indicating charging at 800 V), the control apparatus 20 determines YES in step S8, performs the processing of step S10, and performs the processing of step S11 on the premise of step S10. If the signal received in step S7 is the signal indicating the second charging condition (for example, the signal indicating charging at 400 V), the control apparatus 20 determines NO in step S8, performs the processing of step S9, and performs the processing of step S11 on the premise of step S9.

If the processing of step S11 is performed according to the settings made in step S10, the control apparatus 20 performs charging according to the first charging condition. Specifically, the control apparatus 20 turns on the first relay 41 and turns off the second relay 42. Furthermore, the control apparatus 20 turns on the switches of the switch unit 22 and turns off the switches of the switch unit 38. In this case, the control apparatus 20 causes the first DC/DC converter 31 to perform a step-down operation of stepping down the voltage applied to the second power path 62 and applying a voltage of 400 V to the first power path 61. Note that, in this case, the control apparatus 20 may stop the operation of the first DC/DC converter 31.

Figure 6:
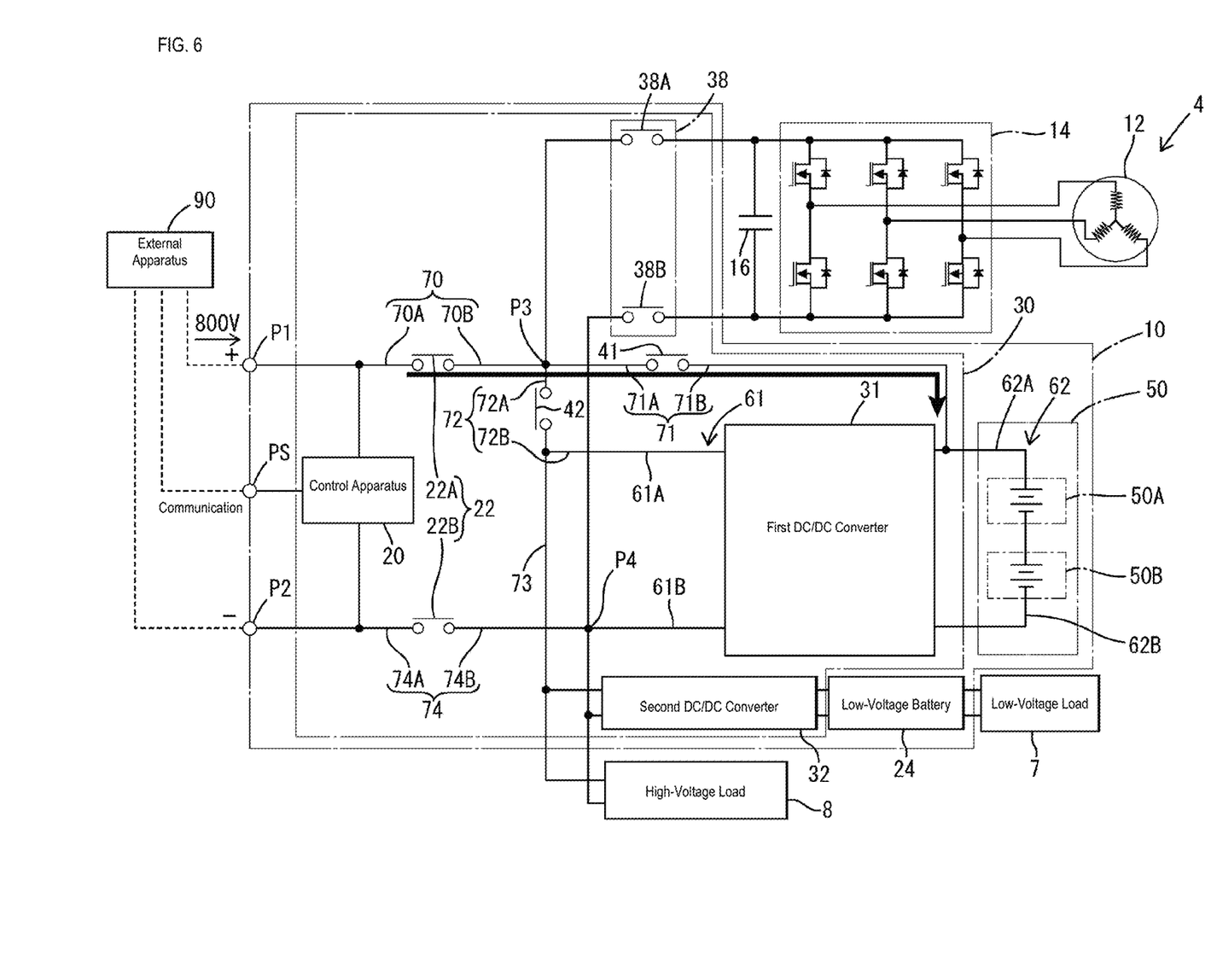
FIG. 6 is a descriptive diagram for describing a first charging state of the power source system of the first embodiment.

In this way, in the case where power is supplied from the external apparatus 90 to the vehicle 1, if the voltage applied to the charging path 70 is in the first voltage state, the control apparatus 20 turns on the first relay 41 and turns off the second relay 42. Specifically, "if the voltage applied to the charging path 70 is in the first voltage state" is the case where the voltage of the first voltage (for example, 800 V) is applied and a charging current is supplied. When the control apparatus 20 operates in this manner, as shown in FIG. 6, a charging current that is based on power supplied from the external apparatus 90 is supplied to the high-voltage battery 50 side via the charging path 70, the first conductive path 71, and the first relay 41, and the high-voltage battery 50 is charged.

If the processing of step S11 is performed according to the settings made in step S9, the control apparatus 20 performs charging according to the second charging condition. Specifically, the control apparatus 20 turns off the first relay 41 and turns on the second relay 42. Furthermore, the control apparatus 20 also turns on the switches of the switch unit 22 and turns off the switches of the switch unit 38. On the other hand, the control apparatus 20 causes the first DC/DC converter 31 to perform a step-up operation such that the voltage applied to the first power path 61 is stepped up and a voltage of 800 V is applied to the second power path 62.

Figure 7:
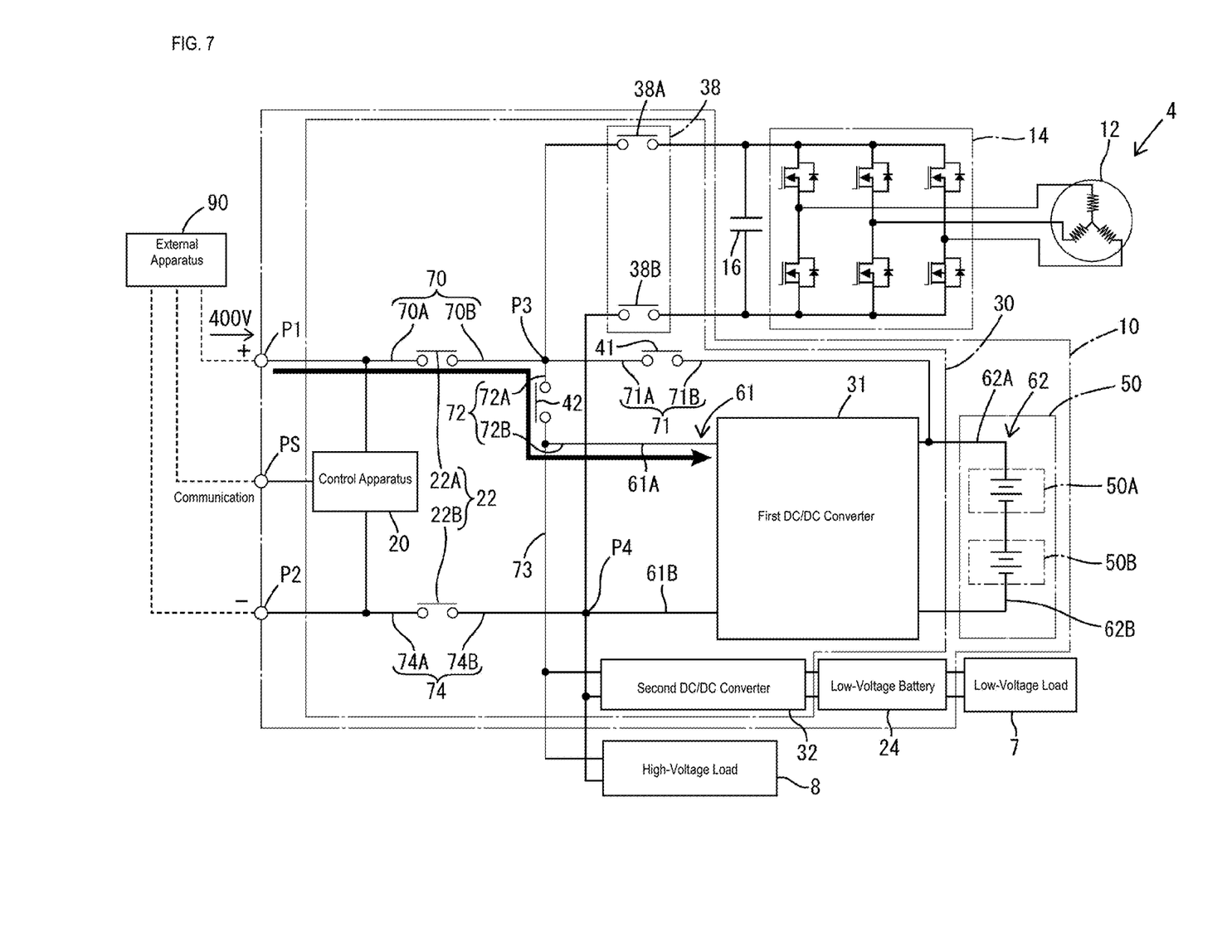
FIG. 7 is a descriptive diagram for describing a second charging state of the power source system of the first embodiment.

In this way, if power is supplied from the external apparatus 90 or the in-vehicle charging device 28 and the voltage applied to the charging path 70 is in the second voltage state, the control apparatus 20 turns off the first relay 41 and also causes the first DC/DC converter 31 to perform the first operation. The "the voltage applied to the charging path 70 is in the second voltage state" is the case where the voltage applied to the charging path 70 is lower than that of the first voltage state, specifically, a case where the voltage of the second voltage (for example, 400 V) is applied and a charging current is supplied. When the control apparatus 20 operates in this manner, as shown in FIG. 7, current that is based on power supplied from the external apparatus 90 or the in-vehicle charging device 28 is supplied to the first DC/DC converter 31 side via the charging path 70, the second conductive path 72, and the second relay 42. Then, the high-voltage battery 50 is charged by a charging current that is based on a voltage converted (specifically, stepped up) by the first DC/DC converter 31.

After step S11, the control apparatus 20 determines whether or not the predetermined charging completion condition has been met in step S12. The charging completion condition is, for example, that a cable of the external apparatus 90 has been removed, that the high-voltage battery 50 has entered a fully charged state, or another condition. If it is determined in step S12 that the predetermined charging completion condition has not been met (NO in step S12), the control apparatus 20 returns the processing to step S1 and performs the processing from step S1 again. If the predetermined charging completion condition is determined as having been met in step S12 (YES in step S12), the control apparatus 20 advances the processing to step S13.

If YES is determined in step S6 or YES is determined in step S12, the control apparatus 20 performs the processing of step S13. In step S13, the control apparatus 20 turns off the first relay 41 and the second relay 42, and brings the first DC/DC converter 31 into a standby state where operation thereof is stopped. Then, after step S13, the control apparatus 20 terminates the control shown in FIG. 3.

Effects of the present disclosure are illustrated below. The aforementioned power source system 30 enters a first operation state where power from the high-voltage battery 50 is supplied to the motor 12 side via the first conductive path 71 and the first relay 41 when the first relay 41 is on. Accordingly, a relatively high voltage can be supplied to the motor 12 side in first operation state. Also, the power source system 30 enters a second operation state where power from the first DC/DC converter 31 is supplied to the motor 12 side via the second conductive path 72 as a result of the first DC/DC converter 31 performing the second operation when the first relay 41 is off. Accordingly, a relatively high voltage can be supplied to the motor 12 side in the second operation state. Furthermore, the power source system 30 can realize the first operation state and the second operation state by using the first DC/DC converter 31 and the first relay 41 which are used to charge the high-voltage battery 50. Accordingly, the power source system 30 can more easily realize a configuration in which a relatively high voltage and a relatively low voltage can be supplied based on power from the high-voltage battery 50.

The power source system 30 can perform control to make a switch such that a relatively high voltage is supplied from the high-voltage battery 50 to the motor 12 side without involving the first DC/DC converter 31, in response to the first condition being met. Also, the power source system 30 can perform control to make a switch such that a relatively low voltage is supplied from the high-voltage battery 50 to the motor 12 side via the first DC/DC converter 31, in response to the second condition being met.

The power source system 30 can allow and block the flow of current through the second conductive path 72 as needed, and is advantageous in a configuration in which a situation may occur where blocking of the second conductive path 72 is desirable.

In the first operation state, the power source system 30 can supply a relatively high voltage from the high-voltage battery 50 to the motor 12 side without supplying the power via the first DC/DC converter 31. On the other hand, in the first operation state, the power source system 30 can operate to block current from flowing to the motor 12 side via the second conductive path 72 while supplying a relatively low voltage from the first DC/DC converter 31 to the load side. The power source system 30 can operate in this manner, and thus a separate converter that is different from the first DC/DC converter 31 is not required to supply a relatively low voltage from the high-voltage battery 50 to a load. Accordingly, the power source system 30 can realize the above functions while realizing a simplified apparatus configuration.

The power source system 30 can perform control to make a switch such that a relatively high voltage is supplied from the high-voltage battery 50 to the motor 12 side without involving the first DC/DC converter 31, in response to the first condition being met. Furthermore, in the case where a relatively high voltage is supplied to the motor 12 side in response to the first condition being met, the power source system 30 can perform control to turn off the second relay 42 while causing the first DC/DC converter 31 to perform the second operation in parallel. That is, the power source system 30 can perform control for supplying a relatively high voltage to the motor 12 side and control for stably supplying a relatively low voltage to the load side in parallel, and such parallel control can be realized with a simpler configuration.

When the power source system 30 performs a charging method using a relatively high voltage in which the voltage applied to the charging path 70 enters the first voltage state, the control apparatus 20 turns on the first relay 41. Accordingly, at the time of charging with a relatively high voltage, the power source system 30 can swiftly perform an operation such as directly charging the high-voltage battery 50 without involving the first DC/DC converter 31 by performing control. Also, when a charging method using a relatively low voltage in which the voltage applied to the charging path 70 enters the second voltage state, the control apparatus 20 turns off the relay. Accordingly, at the time of charging with a relatively low voltage, the power source system 30 can swiftly perform an operation such as charging the high-voltage battery 50 via the first DC/DC converter 31 by performing control.

OTHER EMBODIMENTS

The present disclosure is not limited to the embodiment illustrated using the above description and drawings. For example, the features of the embodiments described above and below can be combined in various ways provided that no contradiction arises. Also, any features of the embodiments described above or below can be omitted unless they are clearly described as being essential. Furthermore, the above-described embodiment may be changed in the following manner.

In the above embodiment, the power source system 30 is configured to be supplied with a charging voltage of 800 V or 400 V from the external apparatus 90, but the present invention is not limited to this. In the combination of voltages that can be supplied from an external device of the vehicle 1 to the power source system 30, one or both of 800 V or 400 V may be different. Alternatively, the power source system 30 may be configured to be able to be supplied with three or more types of voltages from an external device of the vehicle 1.

In the above embodiment, both the first relay 41 and the second relay 42 are semiconductor relays, but one or both of the first relay 41 and the second relay 42 may be an electromagnetic relay.

In the above embodiment, the high-voltage battery 50 is constituted by two power storage units 50A and 50B that are connected in series, but the configuration is not limited to this example. The high-voltage battery 50 may be constituted by three or more power storage units connected in series, or a configuration may be employed where at least some of a plurality of power storage units in a configuration are connected in parallel. Alternatively, the high-voltage battery 50 may have a configuration including a plurality of power storage units and be configured to allow switching of the connection state of the plurality of power storage units.

The embodiments disclosed herein are exemplary in all respects, and should be construed as not being restrictive. The scope of the present invention is indicated by the appended claims rather than the above description, and all changes that fall within the same essential spirit as the scope of the claims are intended to be included therein.

The invention claimed is:

1. A power source system that is to be installed in a vehicle including a travel motor, and into which a charging current flows via a charging path when receiving supply of power from an external apparatus provided external to the vehicle, the power source system comprising:
   a first conductive path and a second conductive path that are electrically connected to the charging path and branch from the charging path;
   a relay that is provided on the first conductive path; and
   a voltage conversion unit configured to perform voltage conversion, wherein the first conductive path is formed as a path between the charging path and a battery, the relay switches between an off state in which current is blocked from flowing between the charging path and the battery via the first conductive path, and an on state in which current is allowed to flow, the second conductive path is disposed between the charging path and the voltage conversion unit, the voltage conversion unit performs at least a first operation of stepping up a voltage applied to the second conductive path and applying the resulting voltage as an output voltage to a conductive path on the battery side, and a second operation of stepping down a voltage applied to the conductive path on the battery side and applying the resulting voltage as an output voltage to the second conductive path, a first operation state where power from the battery is supplied to the motor side via the first conductive path and the relay is entered when the relay is on, and a second operation state where power from the voltage conversion unit is supplied to the motor side via the second conductive path as a result of the voltage conversion unit performing the second operation is entered when the relay is off.

2. The power source system according to claim 1, further comprising a control unit configured to control the relay and the voltage conversion unit, wherein the control unit turns on the relay in response to a first condition being met, and turns off the relay and causes the voltage conversion unit to perform the second operation in response to a second condition that is different from the first condition being met.

3. The power source system according to claim 2, wherein the relay is a first relay, a second relay is provided on the second conductive path, and the second relay switches between an off state in which current is blocked from flowing between the charging path and the voltage conversion unit via the second conductive path, and an on state in which current is allowed to flow.

4. The power source system according to claim 1, wherein the relay is a first relay, a second relay is provided on the second conductive path, and the second relay switches between an off state in which current is blocked from flowing between the charging path and the voltage conversion unit via the second conductive path, and an on state in which current is allowed to flow.

5. The power source system according to claim 4, wherein the second conductive path includes a first supply path that is a path between the charging path and the second relay, and a second supply path that is a path between the second relay and the voltage conversion unit, a third conductive path that is a path for supplying power to a load is electrically connected to the second supply path, and as a result of the second relay being kept off and the voltage conversion unit performing the second operation in the first operation state, power is supplied from the voltage conversion unit to the load side via the third conductive path.

6. The power source system according to claim 1, wherein the relay is a first relay, a second relay is provided on the second conductive path, the second relay is configured to switch between an off state in which current is blocked from flowing between the charging path and the voltage conversion unit via the second conductive path, and an on state in which current is allowed to flow, the second conductive path includes a first supply path that is a path between the charging path and the second relay, and a second supply path that is a path between the second relay and the voltage conversion unit, a third conductive path that is a path for supplying power to a load is electrically connected to the second supply path, the power source system includes a control unit configured to control the first relay, the second relay, and the voltage conversion unit, and the control unit turns on the first relay, turns off the second relay, and causes the voltage conversion unit to perform the second operation in response to a first condition being met, and turns off the first relay, turns on the second relay, and causes the voltage conversion unit to perform the second operation in response to a second condition that is different from the first condition being met.

* * * * *